(12) United States Patent
Nakahashi et al.

(10) Patent No.: US 10,286,615 B2
(45) Date of Patent: May 14, 2019

(54) MOLDING APPARATUS AND MOLDING METHOD

(75) Inventors: Takahiro Nakahashi, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 672 days.

(21) Appl. No.: 14/345,853

(22) PCT Filed: Jul. 23, 2012

(86) PCT No.: PCT/JP2012/068633
§ 371 (c)(1),
(2), (4) Date: Mar. 19, 2014

(87) PCT Pub. No.: WO2013/046887
PCT Pub. Date: Apr. 4, 2013

(65) Prior Publication Data
US 2014/0217626 A1    Aug. 7, 2014

(30) Foreign Application Priority Data
Sep. 29, 2011    (JP) .................................. 2011-215474

(51) Int. Cl.
*B29D 11/00*    (2006.01)
*B29C 43/02*    (2006.01)
*B29C 43/36*    (2006.01)
*B29C 43/58*    (2006.01)
(Continued)

(52) U.S. Cl.
CPC ...... *B29D 11/00413* (2013.01); *B29C 43/021* (2013.01); *B29C 43/36* (2013.01); *B29C 43/56* (2013.01); *B29C 43/58* (2013.01); *B29D 11/0048* (2013.01); *B29C 2043/568* (2013.01);
(Continued)

(58) Field of Classification Search
CPC .......... B29D 11/00413; B29D 11/0048; B29C 43/56; B29C 43/58; B29C 43/36; B29C 43/021; B29C 2043/568; B29C 2043/5808; B29L 2011/0016
See application file for complete search history.

(56) References Cited

U.S. PATENT DOCUMENTS 5,772,905 A    6/1998    Chou
6,309,580 B1   10/2001   Chou
6,482,742 B1   11/2002   Chou
(Continued)

FOREIGN PATENT DOCUMENTS

EP    0416791    3/1991
JP    3-99813    4/1991
(Continued)

OTHER PUBLICATIONS

Foreign-language Written Opinion of the International Searching Authority for PCT/JP2012/068633, dated Oct. 23, 2012.

*Primary Examiner* — Robert J Grun
(74) *Attorney, Agent, or Firm* — Nixon & Vanderhye P.C.

(57) ABSTRACT

A lens molding apparatus (100) of the present invention includes: a mold (1) having a transfer surface (1a); a mold (2) having a transfer surface (2a); heating devices (3a and 3b) for curing, by heating, a resin material which is supplied to the transfer surface (1a) and against which the transfer surface (2a) is pressed; a pressure control section (6) for controlling a support device (4) so that the support device (4) applies a pressure on the resin material; and a DC power source (7) for forming an electric field by applying a voltage between the molds (1 and 2).

8 Claims, 8 Drawing Sheets

(51) Int. Cl.
*B29C 43/56* (2006.01)
*B29L 11/00* (2006.01)

(52) U.S. Cl.
CPC ............... *B29C 2043/5808* (2013.01); *B29L 2011/0016* (2013.01)

(56) References Cited

U.S. PATENT DOCUMENTS

| | | |
|---|---|---|
| 6,518,189 B1 | 2/2003 | Chou |
| 7,887,739 B2 | 2/2011 | Chou et al. |
| 2002/0177319 A1 | 11/2002 | Chou |
| 2004/0036201 A1 | 2/2004 | Chou et al. |
| 2004/0046288 A1 | 3/2004 | Chou et al. |
| 2004/0120644 A1 | 6/2004 | Chou et al. |
| 2004/0131718 A1 | 7/2004 | Chou et al. |
| 2004/0137734 A1 | 7/2004 | Chou et al. |
| 2005/0037143 A1 | 2/2005 | Chou et al. |
| 2005/0145119 A1 | 7/2005 | Tan et al. |
| 2005/0146078 A1 | 7/2005 | Chou et al. |
| 2007/0082457 A1 | 4/2007 | Chou et al. |
| 2008/0012184 A1 | 1/2008 | Chou |
| 2008/0143019 A1 | 6/2008 | Chou |
| 2008/0213418 A1 | 9/2008 | Tan et al. |
| 2008/0217813 A1 | 9/2008 | Chou et al. |
| 2008/0217822 A1 | 9/2008 | Chou et al. |
| 2008/0277826 A1 | 11/2008 | Chou et al. |
| 2008/0305440 A1 | 12/2008 | Willson et al. |
| 2010/0236705 A1 | 9/2010 | Chou |
| 2011/0074055 A1 | 3/2011 | Nakahashi et al. |

FOREIGN PATENT DOCUMENTS

| | | |
|---|---|---|
| JP | 10-180786 | 7/1998 |
| JP | 2005-527974 | 9/2005 |
| JP | 2011-73300 | 4/2011 |
| WO | WO 03/099536 | 12/2003 |
| WO | WO 2010/119726 | 10/2010 |

F I G. 7
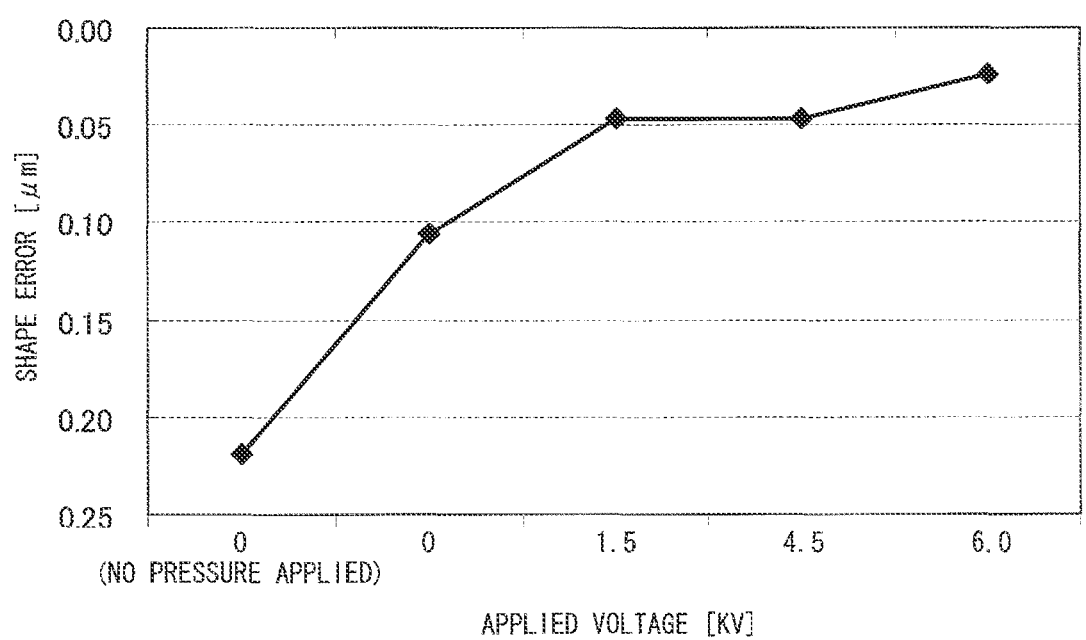

MOLDING APPARATUS AND MOLDING METHOD

This application is the U.S. national phase of International Application No. PCT/JP2012/068633, filed 23 Jul. 2012, which designated the U.S. and claims priority to JP Application No. 2011-215474, filed 29 Sep. 2011, the entire contents of each of which are hereby incorporated by reference.

TECHNICAL FIELD

The present invention relates to a molding apparatus and a molding method, and in particular, to a molding apparatus and a molding method each of which makes it possible to highly accurately mold a molded product having a complex shape such as a lens.

BACKGROUND ART

A conventionally used technique for molding a resin material into a molded product such as a lens includes a compression molding technique for molding a molded product by curing a resin material while pressing, against the resin material, a transfer surface of a mold, the transfer surface being a transfer surface for transferring a predetermined shape to the resin material. Examples of the resin material include a thermoplastic material, a heat-curable material, or a photo-curable material. The resin material is cured by either being heated or being irradiated with light.

Such a compression molding technique is disclosed in, for example, Patent Literatures 1 and 2.

CITATION LIST

Patent Literatures

[Patent Literature 1]
Japanese Patent Application Publication, Tokukaihei, No. 03-099813 A (1991) (Publication Date: Apr. 25, 1991)
[Patent Literature 2]
Japanese Patent Application Publication, Tokukaihei, No. 10-180786 A (1998) (Publication Date: Jul. 7, 1998)

SUMMARY OF INVENTION

Technical Problem

In recent years, a finely shaped product has been desired to be more accurate. For example, in the field of lens molding, an increase in performance of an optical system causes an increase in accuracy of a lens shape to be more and more important. However, according to such a conventional molding technique as described earlier, a large shape error occurs in a molded product. This causes a problem of difficulty in achieving higher accuracy.

Specifically, according to the compression molding technique disclosed in each of Patent Literatures 1 and 2, a position of a mold is fixed until curing of a resin material against which a transfer surface has been pressed is completed. However, since the resin material shrinks as it is cured, the transfer surface of the mold cannot follow the resin material, so that a size of a molded product is smaller than that specified by the transfer surface. Therefore, in view of cure shrinkage in the resin material in advance, the transfer surface needs to be larger in size than the molded product. Therefore, in a case where the molded product has a complex shape or in a case where the resin material has a large cure shrinkage degree, a large shape error occurs in the molded product.

The present invention has been made in view of the problem, and an object of the present invention is to provide a molding apparatus and a molding method each of which makes it possible to highly accurately mold a molded product.

Solution to Problem

In order to attain the object, a molding apparatus of the present invention includes: a first mold having a first transfer surface for transferring a predetermined shape to a dielectric material; a second mold having a second transfer surface for transferring a predetermined shape to the dielectric material, the second transfer surface facing the first transfer surface; curing means for forming a molded product by curing the dielectric material which is supplied to the first transfer surface and against which the second transfer surface is pressed; pressure applying means for applying a pressure on the dielectric material while the dielectric material is being cured by the curing means; and electric field forming means for forming an electric field between the first mold and the second mold while the dielectric material is being cured by the curing means.

According to the configuration, the curing means is configured to form a molded product by curing the dielectric material which is supplied to the first transfer surface of the first mold and against which the second transfer surface of the second mold is pressed. Note here that the dielectric material shrinks while being cured by the curing means. In response to this, while the dielectric material is being cured, a pressure is applied to the dielectric material by the pressure applying means, and an electric field is formed between the first mold and the second mold. Accordingly, until the curing is completed, a state of contact between the mold and the dielectric material is maintained by the second mold which follows the dielectric material by the pressure and by electrostatic attraction caused by the electric field. This allows a significant reduction in error in shape of a molded product which error is caused by cure shrinkage in the dielectric material.

Therefore, it is possible to provide a molding apparatus which makes it possible to form a molded product with high accuracy.

In order to attain the object, a molding apparatus of the present invention includes: a base plate; a mold having a transfer surface for transferring a predetermined shape to a dielectric material; curing means for forming a molded product by curing the dielectric material which is supplied to the base plate and against which the transfer surface is pressed; pressure applying means for applying a pressure on the dielectric material while the dielectric material is being cured by the curing means; and electric field forming means for forming an electric field between the mold and the base plate while the dielectric material is being cured by the curing means.

According to the configuration, the curing means is configured to form a molded product by curing the dielectric material which is supplied to the base plate and against which the transfer surface of the mold is pressed. Note here that the dielectric material shrinks while being cured by the curing means. In response to this, while the dielectric material is being cured, a pressure is applied to the dielectric material by the pressure applying means, and an electric field is formed between the mold and the base plate. Accordingly, until the curing is completed, a state of contact between the mold and the dielectric material is maintained by the mold which follows the dielectric material by the pressure and by electrostatic attraction caused by the electric field. This allows a significant reduction in error in shape of a molded product which error is caused by cure shrinkage in the dielectric material.

Therefore, it is possible to provide a molding apparatus which makes it possible to form a molded product with high accuracy.

In order to attain the object, a molding method of the present invention includes: a supplying step of supplying a dielectric material to a first transfer surface of a first mold, the first transfer surface being a transfer surface for transferring a predetermined shape to the dielectric material; and a curing step of forming a molded product by curing the dielectric material which is supplied to the first transfer surface and against which a second transfer surface of a second mold is pressed, the second transfer surface being a transfer surface for transferring a predetermined shape to the dielectric material, during the curing step, a pressure being applied on the dielectric material, and an electric field being formed between the first mold and the second mold.

According to the configuration, a molded product is formed by curing the dielectric material which is supplied to the first transfer surface of the first mold and against which the second transfer surface of the second mold is pressed. Note here that the dielectric material shrinks during the curing step. In response to this, during the curing step, a pressure is applied to the dielectric material, and an electric field is formed between the first mold and the second mold. Accordingly, until the curing is completed, a state of contact between the mold and the dielectric material is maintained by the second mold which follows the dielectric material by the pressure and by electrostatic attraction caused by the electric field. This allows a significant reduction in error in shape of a molded product which error is caused by cure shrinkage in the dielectric material.

Therefore, it is possible to provide a molding method which makes it possible to form a molded product with high accuracy.

In order to attain the object, a molding method of the present invention includes: a supplying step of supplying a dielectric material to a base plate; and a curing step of forming a molded product by curing the dielectric material which is supplied to the base plate and against which a transfer surface of a mold is pressed, the transfer surface being a transfer surface for transferring a predetermined shape to the dielectric material, during the curing step, a pressure being applied on the dielectric material, and an electric field being formed between the base plate and the mold.

According to the configuration, a molded product is formed by curing the dielectric material which is supplied to the base plate and against which the transfer surface of the mold is pressed. Note here that the dielectric material shrinks during the curing step. In response to this, during the curing step, a pressure is applied to the dielectric material, and an electric field is formed between the mold and the base plate. Accordingly, until the curing is completed, a state of contact between the mold and the dielectric material is maintained by the mold which follows the dielectric material by the pressure and by electrostatic attraction caused by the electric field. This allows a significant reduction in error in shape of a molded product which error is caused by cure shrinkage in the dielectric material.

Therefore, it is possible to provide a molding method which makes it possible to form a molded product with high accuracy.

Advantageous Effects of Invention

As has been described, a molding apparatus of the present invention includes: a first mold having a first transfer surface for transferring a predetermined shape to a dielectric material; a second mold having a second transfer surface for transferring a predetermined shape to the dielectric material, the second transfer surface facing the first transfer surface; curing means for forming a molded product by curing the dielectric material which is supplied to the first transfer surface and against which the second transfer surface is pressed; pressure applying means for applying a pressure on the dielectric material while the dielectric material is being cured by the curing means; and electric field forming means for forming an electric field between the first mold and the second mold while the dielectric material is being cured by the curing means.

Further, a molding method of the present invention includes: a supplying step of supplying a dielectric material to a first transfer surface of a first mold, the first transfer surface being a transfer surface for transferring a predetermined shape to the dielectric material; and a curing step of forming a molded product by curing the dielectric material which is supplied to the first transfer surface and against which a second transfer surface of a second mold is pressed, the second transfer surface being a transfer surface for transferring a predetermined shape to the dielectric material, during the curing step, a pressure being applied on the dielectric material, and an electric field being formed between the first mold and the second mold.

This brings about an effect of providing a molding apparatus and a molding method each of which makes it possible to form a molded product with high accuracy.

BRIEF DESCRIPTION OF DRAWINGS

FIG. 7 is a graph showing a relationship between (i) a pressure to be applied to a resin material and a voltage to be applied between molds and (ii) a shape error in a molded product.

DESCRIPTION OF EMBODIMENTS

The following description discusses, as an example of a molding apparatus of the present invention, a lens molding apparatus for molding a lens.

[Embodiment 1]

Embodiment 1 of the present invention is described below with reference to FIGS. 1 through 6.

(Configuration of Lens Molding Apparatus 100)

Figure 1:
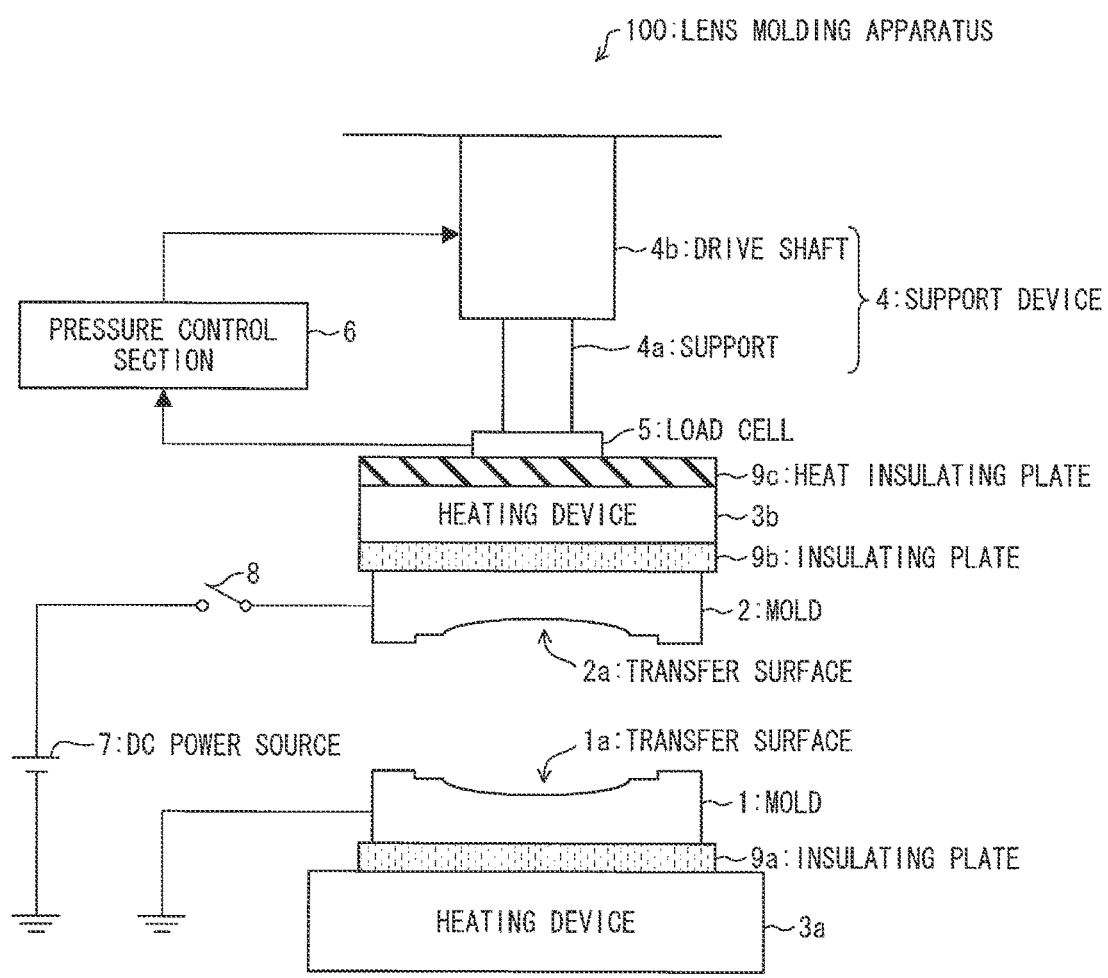
FIG. 1 is a view illustrating a configuration of a lens molding apparatus in accordance with Embodiment 1 of the present invention.

FIG. 1 is a view illustrating a configuration of a lens molding apparatus 100 in accordance with the present embodiment. The lens molding apparatus 100 is an apparatus for forming a lens from a resin material and includes a mold 1, a mold 2, heating devices 3a and 3b, a support device 4, a load cell 5, a pressure control section 6, a DC power source 7, a switch 8, insulating plates 9a and 9b, and a heat insulating plate 9c.

The mold 1 corresponds to a first mold and is provided above the heating device 3a. The mold 2 corresponds to a second mold and is supported by the support device 4 so as be located above the mold 1.

The mold 1 has a transfer surface 1a for transferring a predetermined lens shape to a resin material. The transfer surface 1a has a depression at its center. Similarly, the mold 2 also has a transfer surface 2a for transferring a predetermined lens shape to the resin material. The transfer surface 2a has a depression at its center. Further, the transfer surface 2a faces the transfer surface 1a.

The heating devices 3a and 3b each correspond to curing means. By heating the molds 1 and 2, respectively, the heating devices 3a and 3b cures a resin material supplied to the transfer surface 1a of the mold 1. Start/end of the heating may be controlled by a sequence program or the like, or may be manually controlled.

The load cell 5 is provided between the support device 4 and the mold 2. The load cell 5 detects a load applied thereto, converts the load into an electric signal, and outputs the electric signal. The electric signal from the load cell 5 is supplied to the pressure control section 6.

The support device 4 includes a support 4a and a drive shaft 4b. The support 4a is joined to the load cell 5 and is extendable by the drive shaft 4b. This enables the support device 4 to move the mold 2 up and down in FIG. 1.

The pressure control section 6 controls extension of the support 4a of the support device 4 in accordance with the electric signal from the load cell 5. The pressure control section 6 controls the support device 4 so that a resin material supplied to a space between the molds 1 and 2 receives a pressure while being cured (described later).

Note that the pressure control section 6 may be included in the support device 4. Note also that the support device 4 and the pressure control section 6 constitute pressure applying means.

The DC power source 7 corresponds to electric field forming means. The DC power source 7 has an output voltage of, for example, 6 KV. The DC power source 7 is connected to the mold 2 via the switch 8. Meanwhile, the mold 1 is connected to a GND. Further, the insulating plate 9a is provided between the mold 1 and the heating device 3a, and the insulating plate 9b is provided between the mold 2 and the heating device 3b.

The heat insulating plate 9c is provided between the heating device 3b and the load cell 5. This prevents the load cell 5 from being affected by heat from the heating device 3b.

With the configuration, turn-on of the switch 8 allows an electric field to be formed between the mold 1 and the mold 2. That is, each of the molds 1 and 2 can also function as an electrode for forming an electric field.

Note that, in order to form an electric field, the DC power source 7 may be connected to the mold 1 and the mold 2 may be grounded. Alternatively, a DC voltage may be applied between the mold 1 and the mold 2 while neither the mold 1 nor the mold 2 is grounded. Alternatively, instead of the DC power source 7, an AC power source may be used to form an electric field.

(Lens Molding Process)

Next, a lens molding process carried out in the lens molding apparatus 100 is described with reference to FIGS. 2 through 6.

Figure 2:
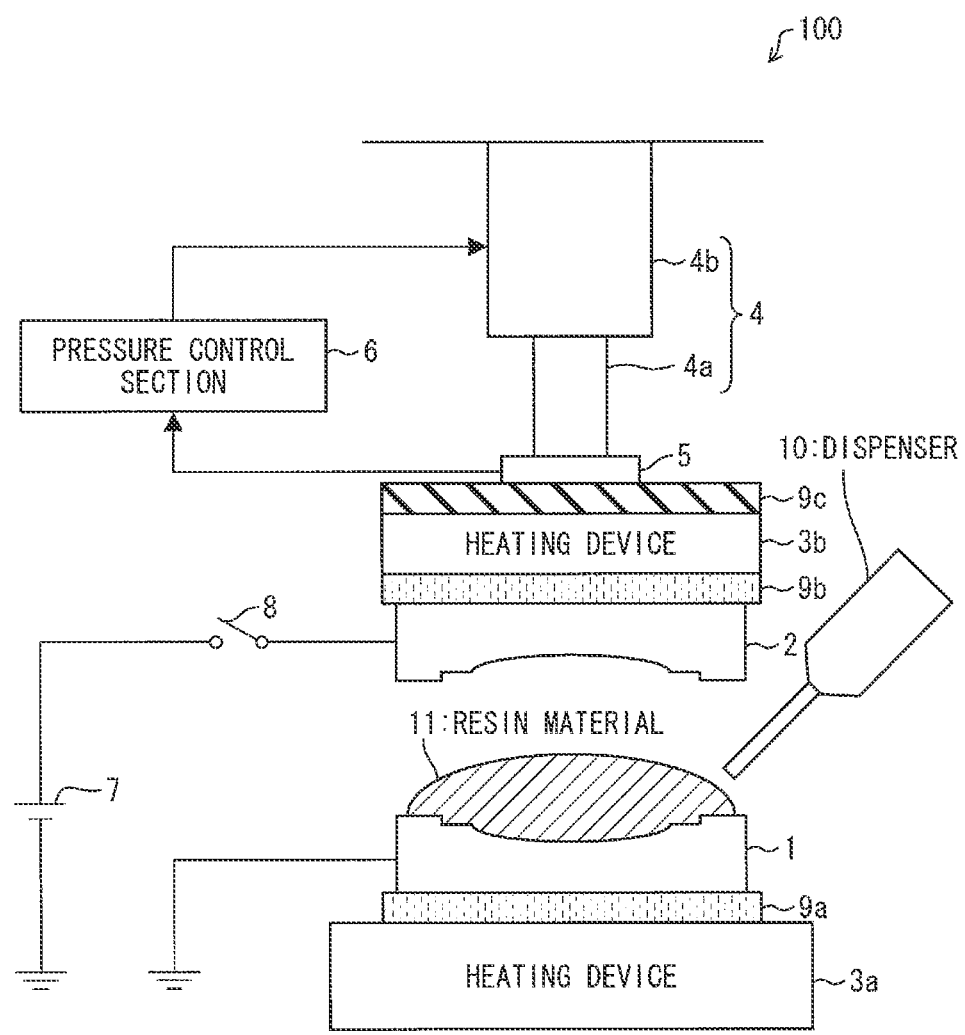
FIG. 2 is a view illustrating a state in which a resin material is supplied to a transfer surface of a mold of the lens molding apparatus illustrated in FIG. 1.

First, as illustrated in FIG. 2, a resin material 11 is supplied to the transfer surface 1a of the mold 1 with use of a dispenser 10 (a supplying step). The resin material 11 corresponds to a dielectric material. According to the present embodiment, the resin material 11 is a heat-curable resin which is cured by being heated and is a dielectric which is polarized by being subjected to an electric field.

Figure 3:
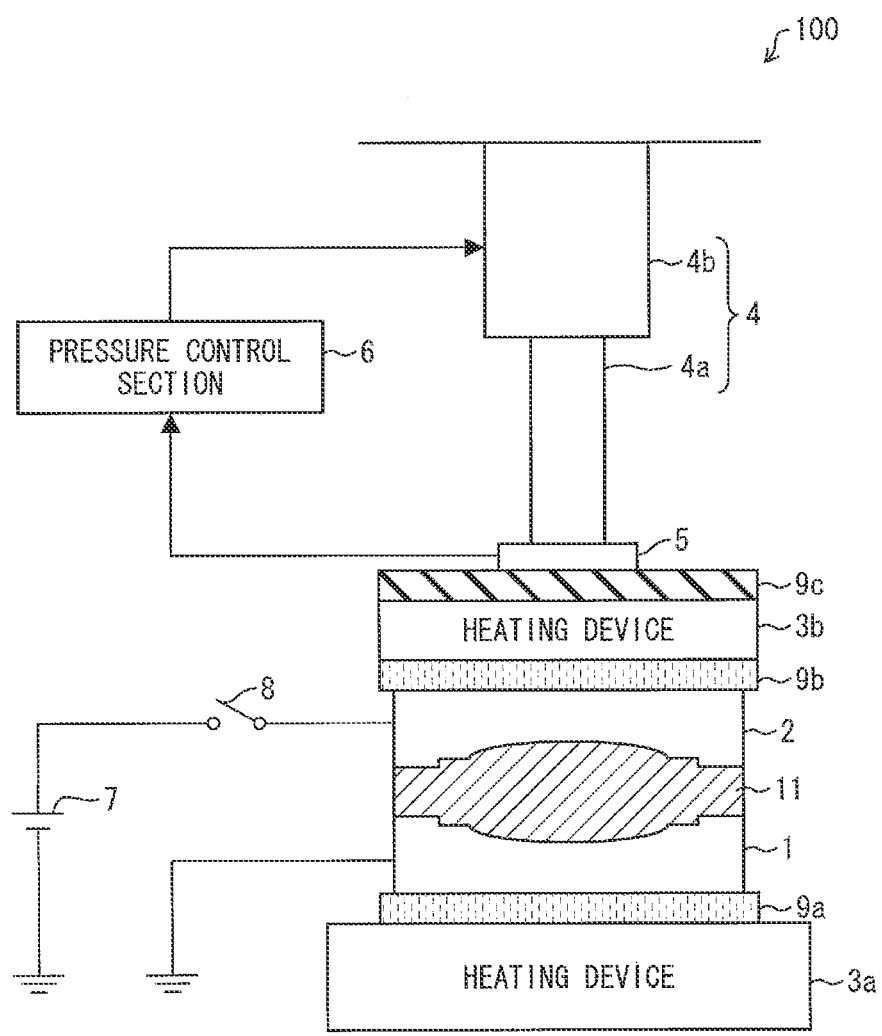
FIG. 3 is a view illustrating a state in which a transfer surface of a mold is pressed against a resin material.

Then, as illustrated in FIG. 3, the support device 4 moves the mold 2 downward so as to cause the transfer surface 2a of the mold 2 to be pressed against the resin material 11. In this state, the heating devices 3a and 3b heat the molds 1 and 2, and the resin material 11 so as to cure the resin material 11 (a curing step).

Figure 4:
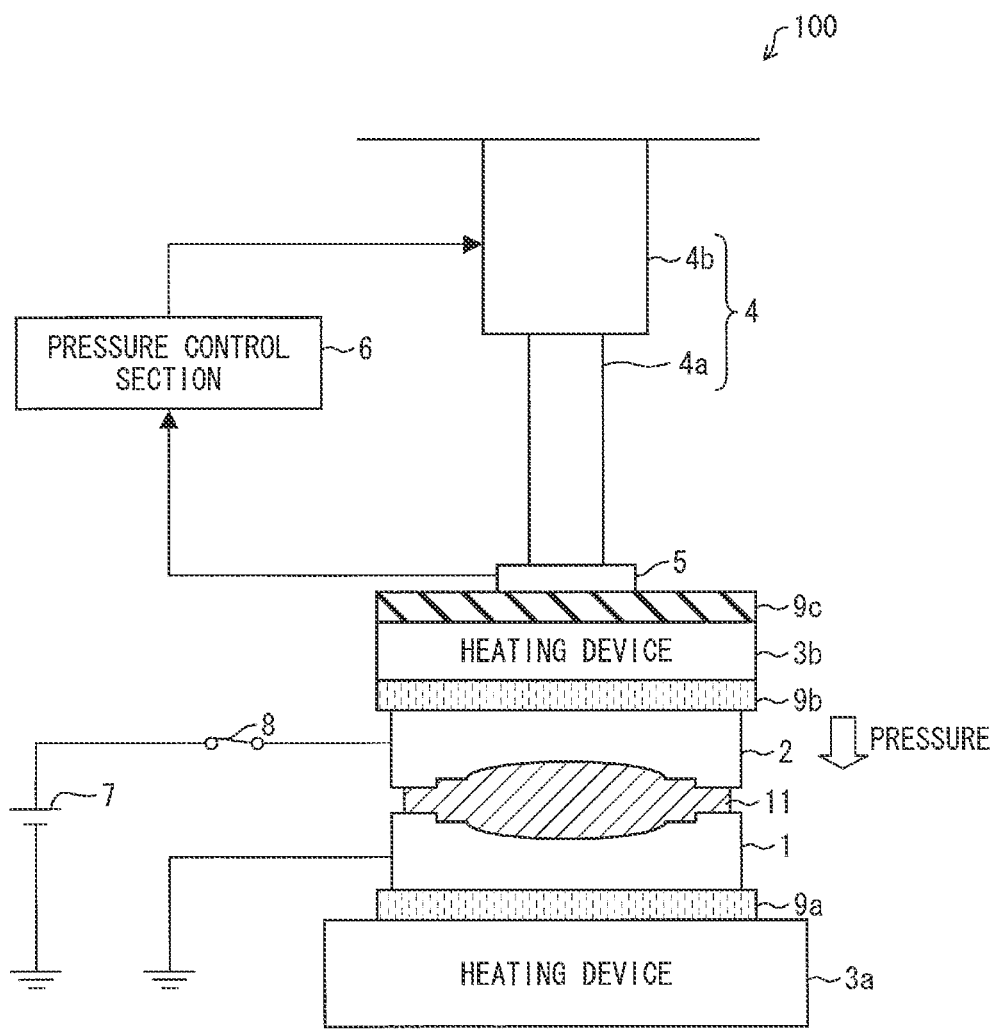
FIG. 4 is a view illustrating a state in which a resin material is being cured while an electric field is formed between molds and a pressure is applied to the resin material.

While the resin material 11 is being cured, a pressure is applied to the resin material 11 (see FIG. 4). Specifically, the pressure control section 6 calculates, in accordance with a load detected by the load cell 5, a pressure applied to the resin material 11 which is being cured, and controls the support device 4 so that the pressure has a predetermined value. Further, while the resin material 11 is being cured, turn-on of the switch 8 causes an electric field to be formed between the mold 1 and the mold 2.

Figure 5:
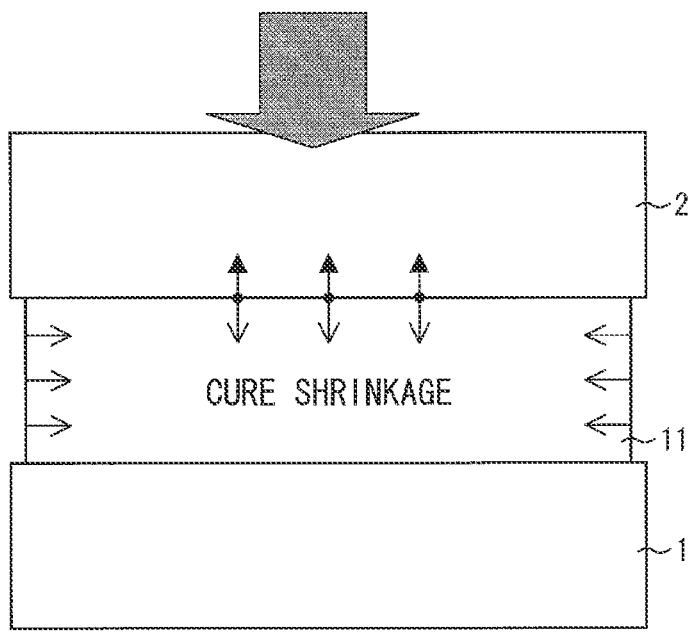
FIG. 5 is a view schematically illustrating a state in which a resin material is being cured.

FIG. 5 is a view schematically illustrating a state in which the resin material 11 is being cured. As illustrated in FIG. 5, cure shrinkage causes a change in shape of a part of the resin material 11 which part is in contact with the mold 2, so that the part is separated from the mold 2. In response to this, during the curing, a pressure is applied to the resin material 11, and an electric field is formed between the mold 1 and the mold 2.

The resin material 11 is an insulator. Hence, dielectric polarization causes a first part (upper part) of the resin material 11 which first part faces the mold 2 to be negatively charged, and causes a second part (lower part) of the resin material 11 which second part faces the mold 1 to be positively charged. Meanwhile, the mold 2 is negatively charged and the mold 1 is positively charged. This causes electrostatic attraction that attracts the resin material 11 to the mold 2 (see upward arrows in FIG. 5).

Accordingly, until the curing is completed, a state of contact between the mold 2 and the resin material 11 is maintained by the mold 2 which follows the resin material 11 by the electrostatic attraction. This allows a significant reduction in error in lens shape which error is caused by cure shrinkage in the resin material 11.

Figure 6:
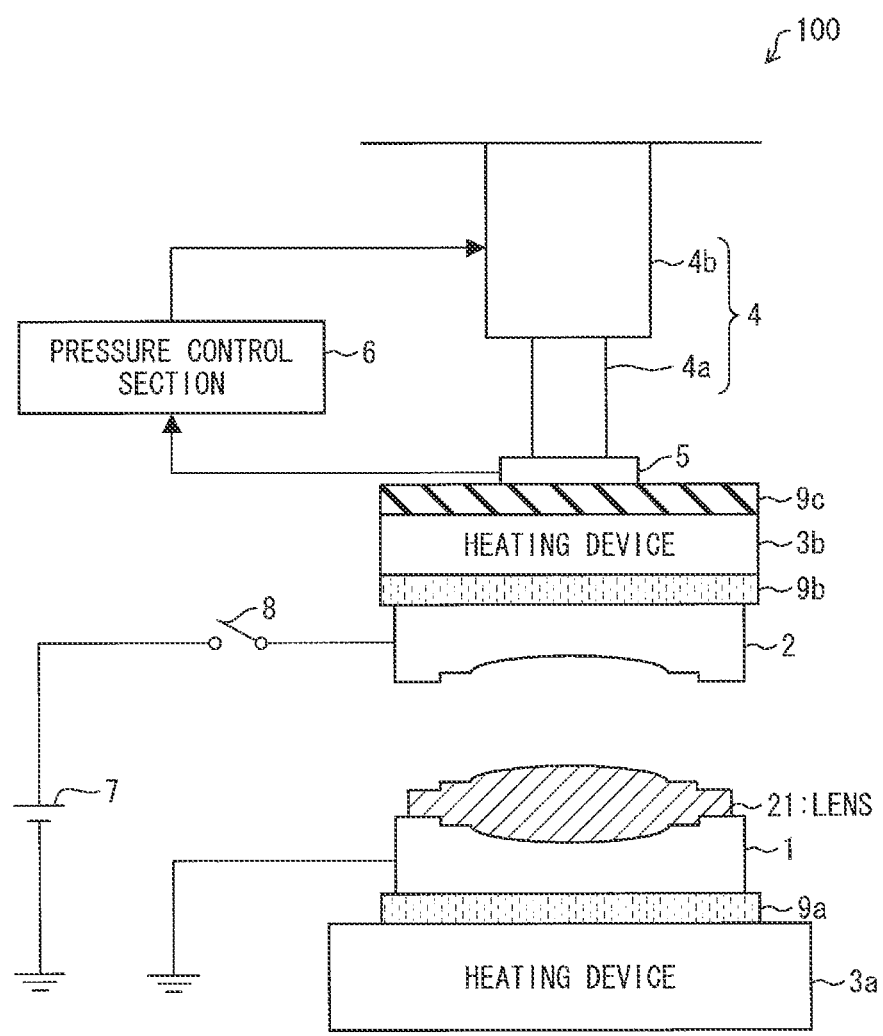
FIG. 6 is a view illustrating a state in which a transfer surface of a mold is separated from a cured resin material.

When the curing is completed, the support device 4 separates the transfer surface 2a from the resin material 11 by raising the mold 2 (see FIG. 6). A lens 21 is thus formed.

(Verification of Effect)

FIG. 7 is a graph showing a relationship between (i) a pressure to be applied to a resin material and a voltage to be applied between molds and (ii) a shape error in a molded product.

According to a conventional molding apparatus, positions of two molds are fixed while a resin material is being cured. Therefore, cure shrinkage in the resin material causes a large shape error in a molded product. According to an experiment carried out by inventors of the present invention, a molded product had a shape error of 0.2186 μm in the conventional molding apparatus. Meanwhile, in a case where a pressure of 10N was applied to a resin material during the curing of the resin material, a molded product had a shape error of 0.1058 µm. Further, as in the present embodiment where voltages of 1.5 KV, 4.5 KV, and 6.0 KV were applied while a pressure of 10 N was applied to a resin material which was being cured, molded products had respective shape errors of 0.0465 µm, 0.0464 µm, and 0.0239 µm. In particular, the case of the application of a voltage of 6.0 KV allowed an increase in transfer accuracy of approximately five times as compared with a case of application of only a pressure, and further allowed an increase in transfer accuracy of approximately ten times as compared with a case of application of no pressure.

As described earlier, in a case where an electric field is formed between two molds while a pressure is applied to a resin material which is being cured, it is possible to further reduce a shape error in a molded product.

In particular, in a case of using a resin material having a large cure shrinkage degree, a very large shape error occurs in a molded product according to a conventional molding apparatus, whereas a shape error in a molded product can be significantly reduced according to the present embodiment, in which a mold follows a resin material.

[Embodiment 2]

Figure 8:
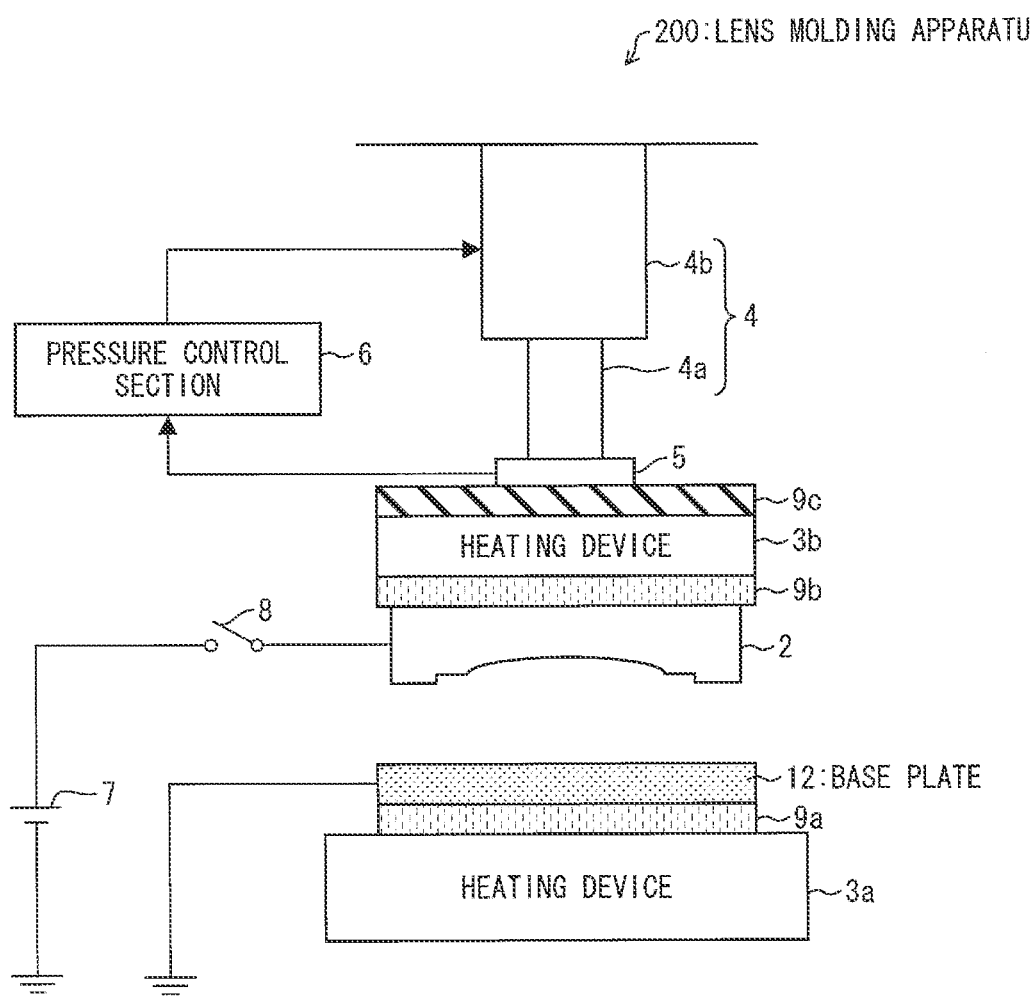
FIG. 8 is a view illustrating a configuration of a lens molding apparatus in accordance with Embodiment 2 of the present invention.

Embodiment 2 of the present invention is described below with reference to FIG. 8.

FIG. 14 is a view illustrating a configuration of a lens molding apparatus 200 in accordance with the present embodiment. The lens molding apparatus 200 is an apparatus for forming a lens from a resin material and includes a mold 2, heating devices 3a and 3b, a support device 4, a load cell 5, a pressure control section 6, a DC power source 7, a switch 8, insulating plates 9a and 9b, a heat insulating plate 9c, and a base plate 12. That is, the lens molding apparatus 200 is obtained by replacing the mold 1 with the base plate 12 in the lens molding apparatus 100 of Embodiment 1.

Members having functions identical to those of the respective members described in Embodiment 1 are given respective identical reference numerals. Further, a lens molding process of the present embodiment is substantially identical to that of Embodiment 1.

As described earlier, the present invention is applicable not only to a configuration in which two molds are used to form a molded product but also to a configuration of the present embodiment in which configuration a single mold and a single base plate are used to form a molded product.

[Summary of Embodiments]

As has been described, a molding apparatus and a molding method of the present invention each make it possible to form a molded product with high accuracy.

Note that the verification experiment set, to 10N, a pressure to be applied to a resin material. However, a specific numerical value of the pressure is appropriately set according to, for example, a type of resin material to be used. Assume here that a molded product has a complex shape. In this case, cure shrinkage in a resin material is nonuniform. Therefore, an application, to a resin material, of a pressure high enough to allow a mold to follow the resin material as much as the cure shrinkage is insufficient to improve accuracy in shape. Accordingly, in this case, it is preferable to apply a pressure high enough to allow movement of the mold to exceed in speed the cure shrinkage of the resin material, that is, a pressure that allows the mold to actively press the resin material.

Further, a pressure to be applied to a resin material may be constant or be changed while the resin material is being cured. For example, the pressure to be applied to the resin material may be gradually decreased in accordance with how the curing of the resin material progresses.

According to the embodiments, a pressure is applied to a resin material via an upper-side mold. However, a direction in which the pressure is applied is not limited to this. For example, the configuration illustrated in FIG. 1 may be a configuration in which a pressure is applied to a resin material by pushing up the lower-side mold 1 without changing a position of the upper-side mold 2. Similarly, the configuration illustrated in FIG. 8 may be a configuration in which a pressure is applied to a resin material by pushing up the base plate 12 without changing a position of the mold 2.

The embodiments each use a heat-curable resin as a resin material. However, the resin material is not limited to this. For example, it is possible to use a photo-curable resin that is cured by being irradiated with UV. In this case, instead of a heating device, a UV irradiation device is used.

The present invention is not limited to the description of the embodiments above, but may be altered within the scope of the claims. An embodiment based on a proper combination of technical means disclosed in different embodiments is encompassed in the technical scope of the invention.

(Main Points of the Invention)

As has been described, the molding apparatus according to the embodiments of the present invention may be configured such that the electric field forming means is configured to form the electric field by applying a voltage between the first mold and the second mold.

The molding method according to the embodiments of the present invention may be configured such that the electric field is formed by applying a voltage between the first mold and the second mold.

The molding apparatus according to the embodiments of the present invention may be configured such that the electric field forming means is configured to form the electric field by applying a voltage between the mold and the base plate.

The molding method according to the embodiments of the present invention may be configured such that the electric field is formed by applying a voltage between the base plate and the mold.

The molding apparatus and the molding method according to the embodiments of the present invention are each preferably configured such that the molded product is a lens.

As described above, the molding apparatus and the molding method according to the embodiments of the present invention each make it possible to form a molded product with high accuracy. Therefore, the molding apparatus and the molding method are each particularly suitable to form a lens having a complex shape.

INDUSTRIAL APPLICABILITY

The present invention is applicable not only to a lens molding apparatus and a lens molding method but also to a molding apparatus and a molding method for molding any molded product other than lenses.

REFERENCE SIGNS LIST

1 mold (first mold)
1a transfer surface (first transfer surface)
2 mold (second mold)
2a transfer surface (second transfer surface)
3a heating device (curing means)
3b heating device (curing means)

4 support device (pressure applying means)
4a support
4b drive shaft
5 load cell
6 pressure control section (pressure applying means)
7 DC power source (electric field forming means)
8 switch
9a insulating plate
9b insulating plate
9c heat insulating plate
10 dispenser
11 resin material (dielectric material)
12 base plate
21 lens (molded product)
100 lens molding apparatus (molding apparatus)
200 lens molding apparatus (molding apparatus)

The invention claimed is:

1. A molding method comprising:
a supplying step of supplying a dielectric material to a first transfer surface of a first mold, the first transfer surface being a transfer surface for transferring a predetermined shape to the dielectric material; and
a curing step of forming a molded product by curing the dielectric material which is supplied to the first transfer surface and against which a second transfer surface of a second mold is pressed, the second transfer surface being a transfer surface for transferring a predetermined shape to the dielectric material,
during the curing step, a gradual decrease in pressure applied on the dielectric material being made in accordance with progression of the curing of the dielectric material by calculating the pressure in accordance of a detected load applied to a load cell with which the second mold is provided, and an electric field starting to be formed between the first mold and the second mold while the dielectric material is being cured,
until the dielectric material completes being cured, the gradual decrease in the pressure causing the second mold to follow the dielectric material in accordance with the progression of the curing of the dielectric material, which shrinks as the dielectric material is cured, so that a state of contact between the second mold and the dielectric material is maintained, and
in the curing step, the dielectric material is cured through heating of (i) the first mold with use of a first heating device with which the first mold is provided and (ii) the second mold with use of a second heating device with which the second mold is provided.

2. The molding method according to claim 1, wherein the electric field is formed by applying a voltage between the first mold and the second mold.

3. The molding method according to claim 1, wherein the molded product is a lens.

4. The molding method according to claim 1, wherein the first mold and the first heating device are separated from each other by a first insulating plate, and the second mold and the second heating device are separated from each other by a second insulating plate.

5. A molding method comprising:
a supplying step of supplying a dielectric material to a base plate; and
a curing step of forming a molded product by curing the dielectric material which is supplied to the base plate and against which a transfer surface of a mold is pressed, the transfer surface being a transfer surface for transferring a predetermined shape to the dielectric material,
during the curing step, a gradual decrease in pressure applied on the dielectric material being made in accordance with progression of the curing of the dielectric material by calculating the in accordance of a detected load applied to a load cell with which the mold is provided, and an electric field starting to be formed between the base plate and the mold while the dielectric material is being cured,
until the dielectric material completes being cured, the gradual decrease in the pressure causing the mold to follow the dielectric material in accordance with the progression of the curing of the dielectric material, which shrinks as the dielectric material is cured, so that a state of contact between the mold and the dielectric material is maintained, and
in the curing step, the dielectric material is cured through heating of (i) the base plate with use of a first heating device with which the base plate is provided and (ii) the mold with use of a second heating device with which the mold is provided.

6. The molding method according to claim 5, wherein the electric field is formed by applying a voltage between the base plate and the mold.

7. The molding method according to claim 5, wherein the molded product is a lens.

8. The molding method according to claim 5, wherein the base plate and the first heating device are separated from each other by a first insulating plate, and the mold and the second heating device are separated from each other by a second insulating plate.

* * * * *